(12) United States Patent
Johnson et al.

(10) Patent No.: US 8,892,753 B2
(45) Date of Patent: Nov. 18, 2014

(54) SYSTEM AND METHOD FOR THE DETERMINATION AND ASSIGNMENT OF A UNIQUE LOCAL CHANNEL IDENTIFIER (ULCI) TO ENABLE THE MULTI-SITE AND MULTI-USER SHARING OF CONTENT

(75) Inventors: Brian David Johnson, Portland, OR (US); David B. Andersen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 11/963,932

(22) Filed: Dec. 24, 2007

(65) Prior Publication Data

US 2009/0164559 A1 Jun. 25, 2009

(51) Int. Cl.
| | | |
|---|---|---|
| G06F 15/16 | (2006.01) | |
| H04N 7/173 | (2011.01) | |
| H04N 21/25 | (2011.01) | |
| H04N 21/2743 | (2011.01) | |
| H04L 29/06 | (2006.01) | |
| H04N 21/4788 | (2011.01) | |
| H04L 12/18 | (2006.01) | |
| H04N 21/2668 | (2011.01) | |
| H04N 21/64 | (2011.01) | |

(52) U.S. Cl.
CPC ........ *H04L 65/4084* (2013.01); *H04N 7/17318* (2013.01); *H04N 21/252* (2013.01); *H04N 21/2743* (2013.01); *H04N 21/4788* (2013.01); *H04L 12/1822* (2013.01); *H04N 21/2668* (2013.01); *H04N 21/64* (2013.01)

USPC ............ 709/229; 709/228; 709/227; 709/226

(58) Field of Classification Search
CPC ........................................................ H04L 29/06
USPC .................................. 709/229, 227, 228, 226
See application file for complete search history.

(56) References Cited

U.S. PATENT DOCUMENTS

| | | | | |
|---|---|---|---|---|
| 2002/0144273 | A1* | 10/2002 | Reto ................................ | 725/86 |
| 2005/0149987 | A1* | 7/2005 | Boccon-Gibod et al. ...... | 725/135 |
| 2007/0006277 | A1* | 1/2007 | Mills et al. ..................... | 725/153 |
| 2007/0198738 | A1* | 8/2007 | Angiolillo et al. ............. | 709/231 |
| 2007/0199019 | A1* | 8/2007 | Angiolillo et al. .............. | 725/39 |
| 2007/0299976 | A1* | 12/2007 | Zafar et al. .................... | 709/229 |
| 2008/0028083 | A1* | 1/2008 | Rezvani et al. ................ | 709/229 |
| 2009/0094656 | A1* | 4/2009 | Carlucci ........................ | 725/115 |
| 2009/0133069 | A1* | 5/2009 | Conness et al. ................. | 725/46 |
| 2009/0164654 | A1* | 6/2009 | Krstulich ....................... | 709/231 |

* cited by examiner

*Primary Examiner* — Noel Beharry
*Assistant Examiner* — Abdelnabi Musa
(74) *Attorney, Agent, or Firm* — Garrett IP, LLC

(57) ABSTRACT

A system and method for the determination and assignment of a unique local channel identifier (ULCI) to enable the multi-site and multi-user sharing of content are described. Various embodiments allow sending by a primary user to a server an indication of one or more users to be invited to use a personal channel. The server determines a unique local channel identifier (ULCI) for the personal channel, where the ULCI represents a common open channel for the primary user and the one or more invited users. The primary user and the one or more invited users are allowed access to the personal channel via the ULCI. Other embodiments are described and claimed.

15 Claims, 8 Drawing Sheets

SYSTEM AND METHOD FOR THE DETERMINATION AND ASSIGNMENT OF A UNIQUE LOCAL CHANNEL IDENTIFIER (ULCI) TO ENABLE THE MULTI-SITE AND MULTI-USER SHARING OF CONTENT

BACKGROUND

The importance for a content service provider (e.g., a television service provider), a device manufacturer, etc., to continuously strive to provide an increased variety of content and options to their users cannot be overstated. No doubt this is one of the reasons why content service providers and device manufactures provide different types of services and/or features to their users including on-demand pay-per-view programming, a variety of subscription options for broadcasted programs, subscriber-defined controls such as parental controls, cable modem Internet access, wireless capabilities, and so forth.

But still, there are limitations to some of these types of services provided via the content service provider and device manufacturer. For example, content service providers and device manufacturers do not offer a way for a user to share personal content with one or more select users via a television environment.

DETAILED DESCRIPTION

Various embodiments may be generally directed to a system and method for the determination and assignment of a unique local channel identifier (ULCI) to enable the multi-site and multi-user sharing of content. In embodiments, a service provider hosts a centralized sharing server that is adapted to allow a primary user to set up a personal channel that may be shared with other users per the primary user's request. In other embodiments, a device and software may provide the capability for a primary user to set up a personal channel that may be shared with other users per the primary user's request. The personal channel may be accessed by the primary and invited users via a ULCI that is keyed in via a remote control device in a television environment, for example. Once the personal channel and ULCI are established, the primary user and/or the invited users may store personal content on and access personal content from the sharing server. In embodiments, the primary user and the invited users, while all connected to the centralized server, are located at multiple sites. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
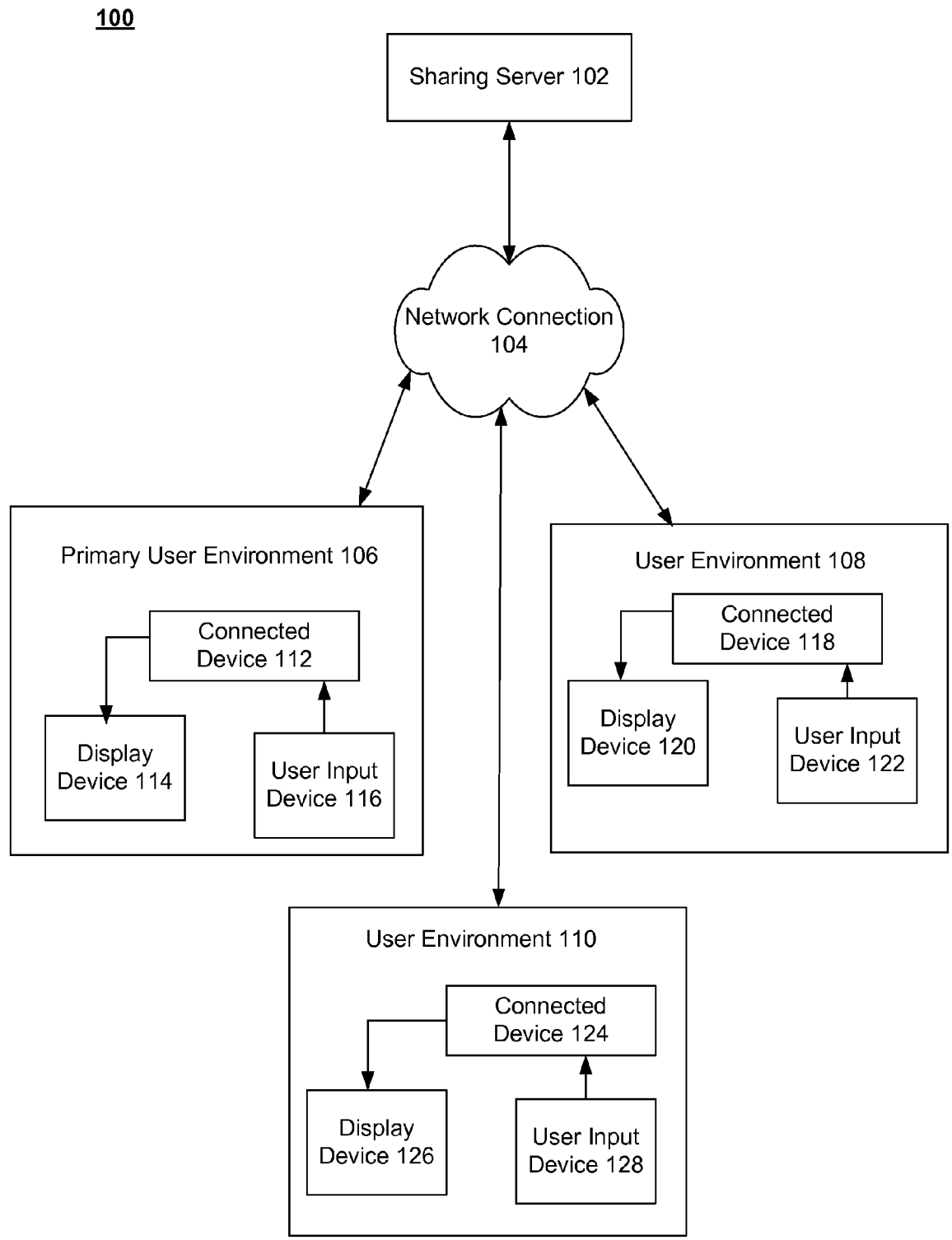
FIG. 1 illustrates one embodiment of a system.

FIG. 1 illustrates an embodiment of a system 100. Referring to FIG. 1, system 100 may comprise a sharing server 102, a network connection 104, a primary user environment 106, a user environment 108 and a user environment 110. Generally, the primary user or environment is any user who initiates the set up of a personal channel with sharing server 102. Thus, the primary user or environment is not limited to primary user environment 106. Each of these elements is described next in more detail.

For illustration purposes only, embodiments of the present invention may be described herein in terms of the service provider being a television service provider and users being subscribers of the service provider. It is important to note that embodiments of the present invention are not limited to the controlled sharing of personal content via television service providers. For example, the service provider may also be a music service provider, a photograph service provider, or any company that wants to facilitate the controlled sharing of personal content. In another embodiment of the invention, the service provider described herein may be generic in the sense that no particular service provider hosts sharing server 102. Here, multiple service providers provide the necessary information to a generic server for the server to provide each of their users with controlled sharing of personal content. In other embodiments, the necessary information for the controlled sharing of personal content may be distributed among multiple devices such as televisions, personal computers, any mobile or ultra-mobile electronic device, any connected device (via a person-to-person (P2P) network, for example), and so forth.

In embodiments, content accessed via the personal channel may be any type of data. The content may be personal in nature, but is not limited to this. In various embodiments, the content may be media information. Examples of media information may generally include any data or signals representing information meant for a user, such as media information, voice information, video information, audio information, image information, textual information, numerical information, alphanumeric symbols, graphics, and so forth. The embodiments are not limited in this context.

At a high level and in various embodiments, sharing server 102 is adapted to allow a primary user or primary user environment 106 to set up a personal channel that may be shared with other users (e.g., user environment 108 and/or user environment 110) per the primary user's request or invitation. Here, the primary user may send a request to server 102 to set up a new personal channel. The primary user also sends an indication of other users that are to be invited to share the new personal channel. In embodiments, the primary user and invited users are located at one or more different sites or locations.

Once sharing server 102 receives the request for a new personal channel and the list of users to be invited to share the channel, server 102 determines a common unassigned channel number for each of the users. In embodiments, sharing server 102 may be hosted by a content service provider (e.g., a television service provider, for example). Thus, sharing server 102 may have access to information about each of its users or subscribers. For example, sharing server 102 may be able to determine whether there are any open or unassigned television channels that are common to one or more of the users. This information allows sharing server 102 to assign a unique local channel identifier (ULCI) for the sharing channel requested by the primary user. In embodiments, this information may be derived by server 102 through the knowledge of the various subscription plans each of the users has with the service provider hosting server 102. In other embodiments, server 102 may query each of the users for the necessary information. Embodiments are not limited to these examples.

In embodiments, once the ULCI for the personal channel is assigned, the primary user and/or the invited users may forward content to be stored by sharing server 102. The stored content may then be accessed by the users via the ULCI and a remote control device, for example. In embodiments, the ULCI may be set up, in terms of a server side service, on other devices that can access that server (e.g., mobile phone, PC, etc.).

In embodiments, the ULCI may be integrated into a networked electronic program or channel guide in a television environment. The networked electronic program guide may be compiled via server 102 or a third party and then downloaded to the primary and invited users. The networked electronic program guide may also be compiled at the user sites. In embodiments, the primary user and invited users may access the personal channel via the networked electronic program guide and a remote control device.

Figure 3:
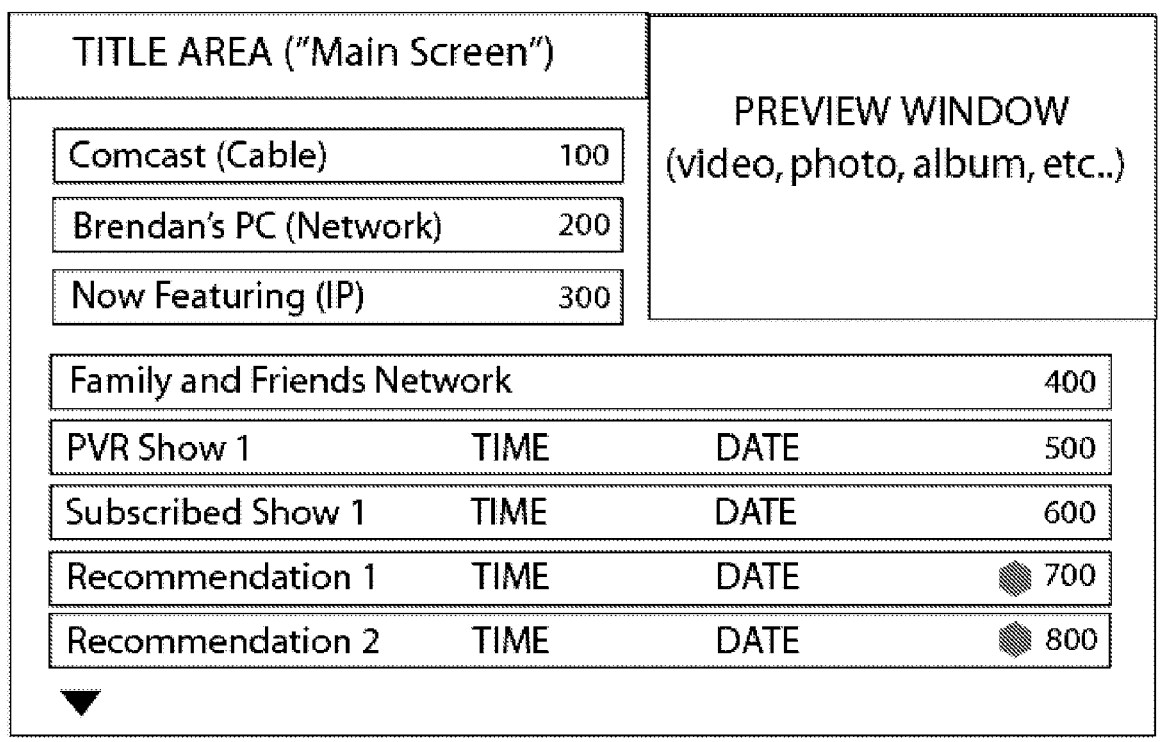
FIG. 3 illustrates one embodiment of a user interface.

An example networked program or channel guide 300 is illustrated in FIG. 3. Referring to FIG. 3, assume that the personal channel was given the title "Family and Friends Network". Further assume that server 102 assigned a ULCI of "400" for the personal channel. Here, users of the personal channel may toggle through guide 300 with a remote control device, for example, and activate the "Family and Friends Network" entry on guide 300. Users may also key the number "400" into the remote control device to directly activate the personal channel. When the personal channel is activated by a user, the user is able to access content in the personal channel. Here, the user may be redirected to storage in sharing server 102 that is storing content for the personal channel. Sharing server 102 may also download the content to the user site. Networked program guide 300 is provided for illustration purposes only and is not meant to limit the invention.

The functionality for a user to activate a personal channel and to have access to its content might be via a local module (software and/or hardware) stored by the user (e.g., stored in connected device 112, 118 or 124, for example), it might be via a module (software and/or hardware) stored by sharing server 102, or it may be some combination of both. For example, if the user activates a personal channel either via keying in the ULCI in a remote control device or via toggling through a networked electronic program guide, then in order to facilitate the access of the content in the personal channel sharing server 102 may implement a variety of data flow connections. For example, sharing server 102 may push the content to the user or the user may be provided with a uniform resource locator (URL) that may be used to access and download the content. Sharing server 102 may also send a command to a third party to download the content to the requesting user. These examples are not meant to limit the invention.

Figure 4:
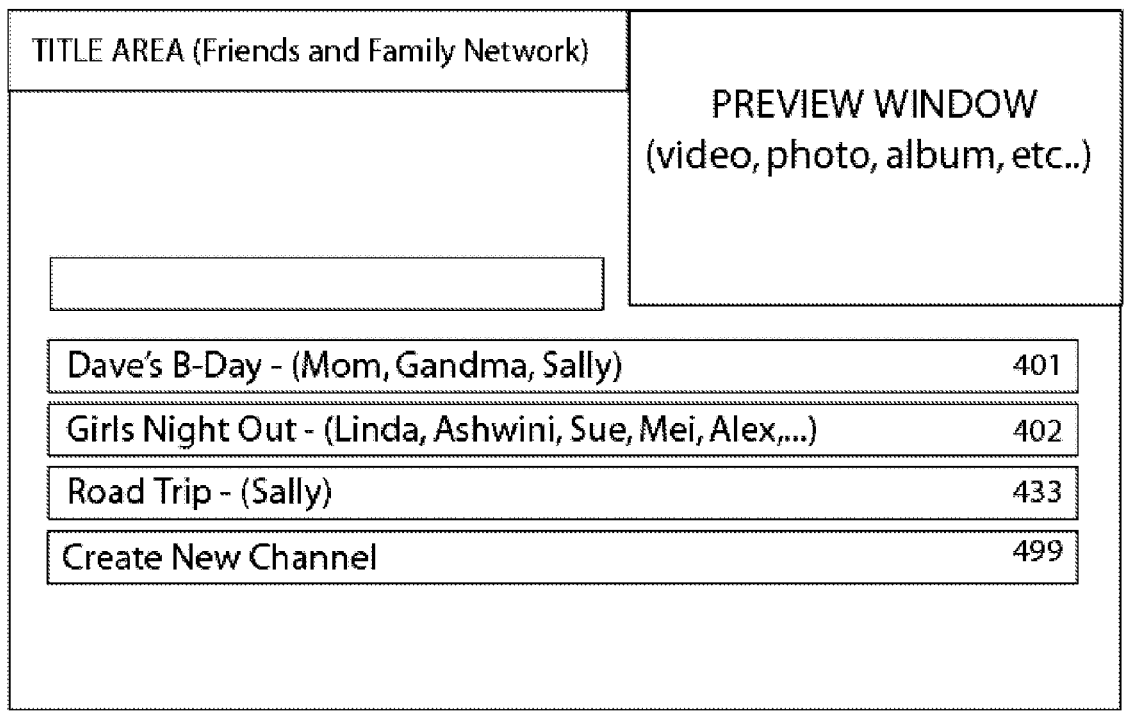
FIG. 4 illustrates one embodiment of a user interface.

Various embodiments allow for the primary user and/or invited users of a personal channel to create sub-channels within the personal channel. For example, user interface 400 of FIG. 4 illustrates sub-channels within the personal channel entitled "Friends and Family Network." Referring to FIG. 4, there are four sub-channels included in personal channel "Friends and Family Network". For example, sub-channel "Dave's B-Day" and content associated with this sub-channel may be accessed via the ULCI of "401" in a similar manner as described above. As shown in FIG. 4, the invited users for "Dave's B-Day" are "Mom", "Grandma" and "Sally". The example user interface 400 is provided for illustration purposes only and is not meant to limit the invention.

Referring back to FIG. 1, sharing server 102 may communicate with users or user environments 106, 108 and 110 via network connection 104. Network connection 104 may be a high speed network connection or any other type of network connection suited for the particular application. Other types of network connections may be added or substituted as new types of network connections are developed.

User environments 106, 108 and 110 may each include a connected device 112, 118 and 124, respectively. Connected devices 112, 118 and 124 are each owned, borrowed or licensed by their respective user. Connected devices 112, 118 and 124 are connected to network connection 104 and may communicate with sharing server 102 via their unique IP address, for example. In embodiments, connected devices 112, 118 and 124 are connected to a peer-to-peer (P2P) network and thus may communicate with each other via network connection 104 or the P2P network. In embodiments, the term "user" as it is used herein may be referring to a device (e.g., connected device 112, 118 or 114). In other embodiments, the term "user" as it is used herein may be referring to the user of a device.

Figure 5:
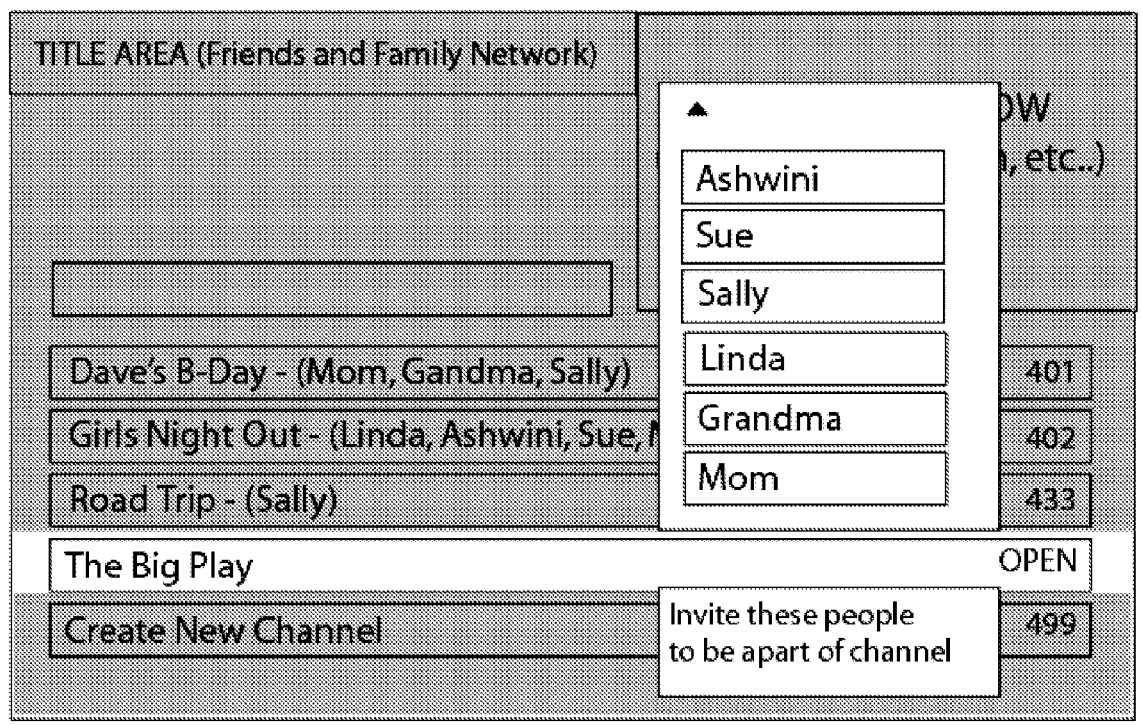
FIG. 5 illustrates one embodiment of a user interface.
Figure 6:
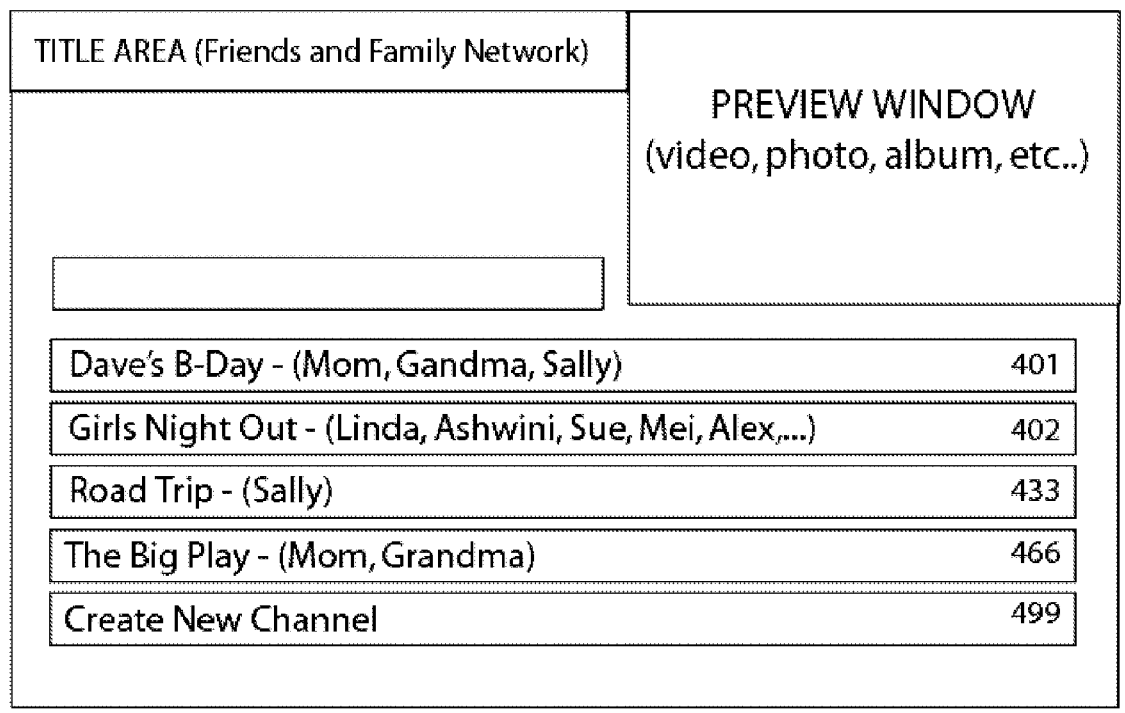
FIG. 6 illustrates one embodiment of a user interface.

In embodiments, connected devices 112, 118 or 114 each represent a device that is adapted to include one or more social networking technologies (e.g., web sharing account technology, buddy lists technology, personal computer (PC) contact list technology via cell phones and blackberries, and so forth). Here, the primary user may use the one or more social networking technologies to more easily invite other users to join or use a personal channel. An example user interface 500 of FIG. 5 illustrates a user setting up a sub-channel "The Big Play" under personal channel "Friends and Family Network". As illustrated in FIG. 5, the user may utilize a pull down menu of users in his or her social network, buddy list or PC contact list to add users to invite to the sub-channel. Assume the user invites "Mom" and "Grandma" from the pull down menu to be invited to sub-channel "The Big Play". Further assume that server 102 assigns the ULCI of "466" to sub-channel "The Big Play". User interface 600 of FIG. 6 illustrates an example updated user interface that includes sub-channel "The Big Play" with an indication that "Mom" and "Grandma" are the invited users for this sub-channel. User interfaces 500 and 600 are provided for illustration purposes only and are not meant to limit the invention. In other embodiments, if the connected device of the primary user is adapted to provide the capability for the primary user to set up a personal channel that may be shared with other users per the primary user's request, then the connected device may query the desired users via the P2P network to participate in the personal channel.

Referring back to FIG. 1, primary user environment 106 may also include a display device 114 and a user input device 116. Likewise, user environment 108 may include a display device 120 and a user input device 122 and user environment 110 may include a display device 126 and a user input device 128.

Display devices 114, 120 and 126 may each be a monitor, projector, a conventional analog television receiver, or any other kind of perceivable video display. The audio portion of the output of the connected devices may be routed through an amplifier, such as an audio/video (A/V) receiver or a sound processing engine, to headphones, speakers or any other type of sound generation device.

User input devices 116, 122 and 128 may be any type of input device suited for a user to communicate with connected devices 112, 118 and 114, respectively. For example, one or more of user input devices 116, 122 and 128 may be a remote control device.

Although only three user environments are illustrated in FIG. 1, this is not meant to limit the invention. In fact, system 100 may include any number of user environments.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 2:
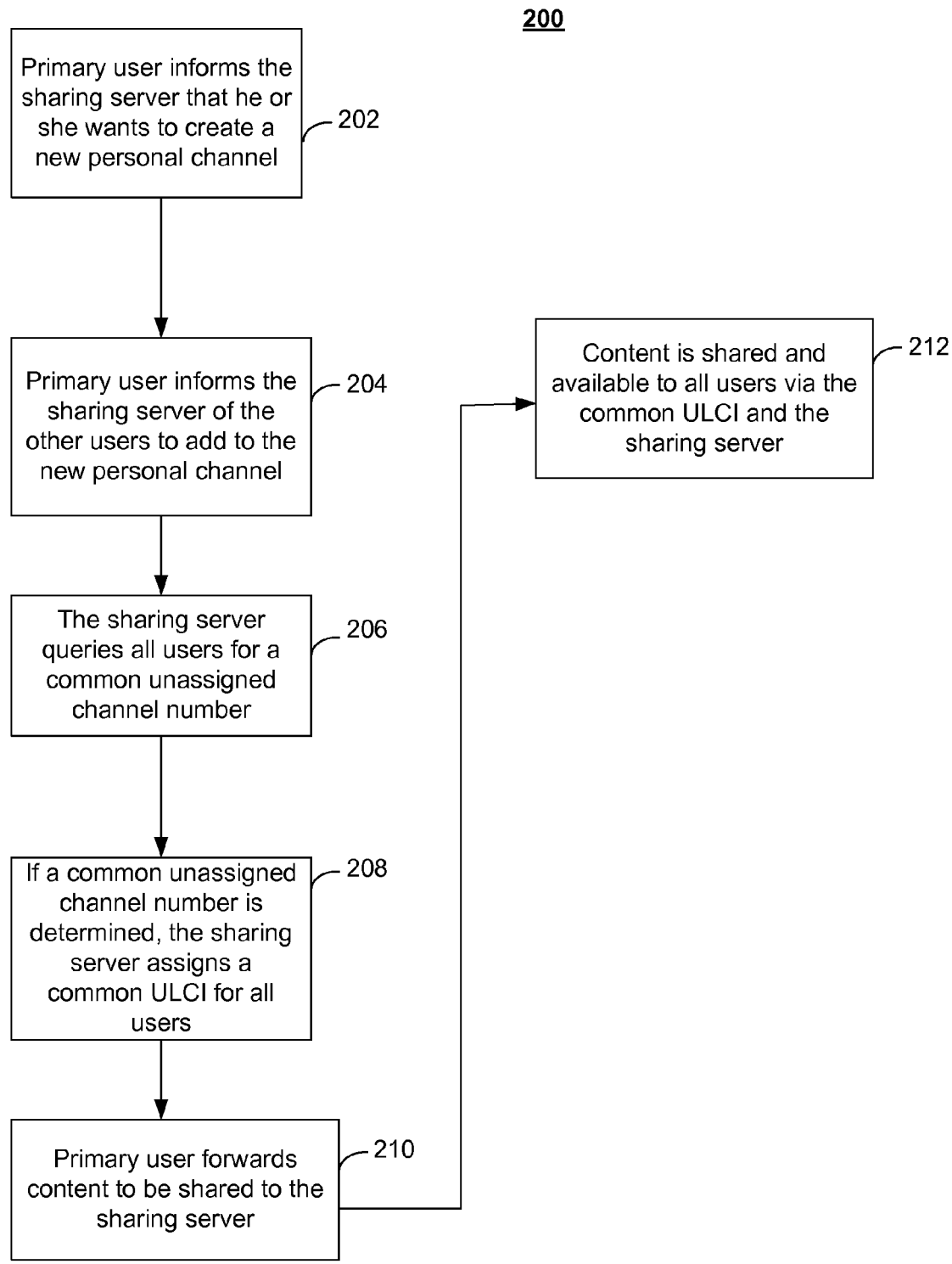
FIG. 2 illustrates one embodiment of a logic flow.

FIG. 2 illustrates one embodiment of a logic flow 200. As shown in logic flow 200, a primary user informs the sharing server that he or she wants to create a new personal channel (such as primary user environment 106 and sharing server 102 from FIG. 1) (block 202).

The primary user informs the sharing server of the other users to add or invite to use the personal channel (such as user environment 108 and/or user environment 110 from FIG. 1) (block 204). As described above, the connected device of the primary user environment may be adapted to include one or more social networking technologies to facilitate the primary user in inviting users to join a personal channel. The primary user may also provide the sharing server with the IP address or other unique identifier of each user that the primary user wants to invite to join the personal channel. In other embodiments, if the connected device of the primary user is adapted to provide the capability for the primary user to set up a personal channel that may be shared with other users per the primary user's request, then the connected device may query the desired users via the P2P network to participate in the personal channel.

The sharing server queries the primary user and the other invited users for a common unassigned channel number (block 206). If a common unassigned channel number is determined, the sharing server assigns a common ULCI to the personal channel for all users of the personal channel (block 208).

The primary user and/or other invited users forward content to be shared via the personal channel to the sharing server (block 210). In embodiments, the sharing server stores the content. The stored content is shared and available to all users via the common ULCI and the sharing server (block 212).

As described above, access to the personal channel may be incorporated into a networked and/or broadcasted program or channel guide or user interface that is displayed on a television screen or other connected device. Here, users that are part of the personal channel may use a remote control device (e.g., user input device 116, 122 or 128 of FIG. 1) to toggle through the channel guide or user interface to access the personal channel. In embodiments, the selection of a channel via the user interface may be accomplished via a mouse, pointing device, remote control device, etc. These examples are provided for illustration purposes only and are not meant to limit the invention.

Figure 7:
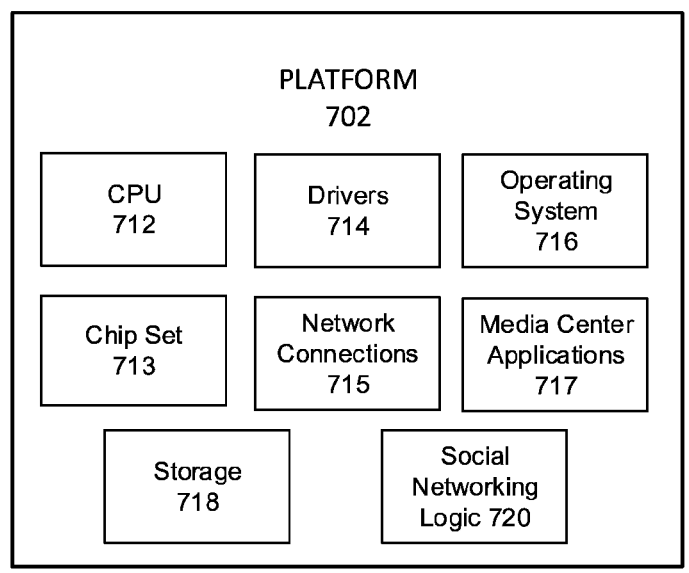
FIG. 7 illustrates one embodiment of a system.

FIG. 7 illustrates an embodiment of a platform 702 (e.g., connected devices 112, 118 or 124 from FIG. 1). In one embodiment, platform 702 may comprise or may be implemented as a media platform 702 such as the Viiv™ media platform made by Intel® Corporation. In one embodiment, platform 702 may interact with the sharing server (such as sharing server 102 via network connection 104 from FIG. 1).

In one embodiment, platform 702 may comprise a CPU 712, a chip set 713, one or more drivers 714, one or more network connections 715, an operating system 716, and/or one or more media center applications 717 comprising one or more software applications, for example. Platform 702 also may comprise storage 718 and social networking logic 720.

In one embodiment, CPU 712 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 713 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 714 may comprise the Quick Resume Technology Drivers made by Intel® to enable users to instantly turn on and off platform 702 like a television with the touch of a button after initial boot-up, when enabled, for example. In addition, chip set 713 may comprise hardware and/or software support for 5.1 surround sound audio and/or high definition 7.1 surround sound audio, for example. Drivers 714 may include a graphics driver for integrated graphics platforms. In one embodiment, the graphics driver may comprise a peripheral component interconnect (PCI) Express graphics card.

In one embodiment, network connections 715 may comprise the PRO/1000 PM or PRO/100 VE/VM network connection, both made by Intel® Corporation.

In one embodiment, operating system 716 may comprise the Windows® XP Media Center made by Microsoft® Corporation. In other embodiments, operating system 716 may comprise Linux®, as well as other types of operating systems. In one embodiment, one or more media center applications 717 may comprise a media shell to enable users to interact with a remote control device from a distance of about 10-feet away from platform 702 or a display device, for example. In one embodiment, the media shell may be referred to as a "10-feet user interface," for example. In addition, one or more media center applications 717 may comprise the Quick Resume Technology made by Intel®, which allows instant on/off functionality and may allow platform 702 to stream content to media adaptors when the platform is turned "off."

In one embodiment, storage 718 may comprise the Matrix Storage technology made by Intel® to increase the storage performance enhanced protection for valuable digital media when multiple hard drives are included. In one embodiment, PVR logic 720 is used to enable the functionality of the invention as described herein. The embodiments, however, are not limited to the elements or in the context shown or described in FIG. 7.

Platform 710 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
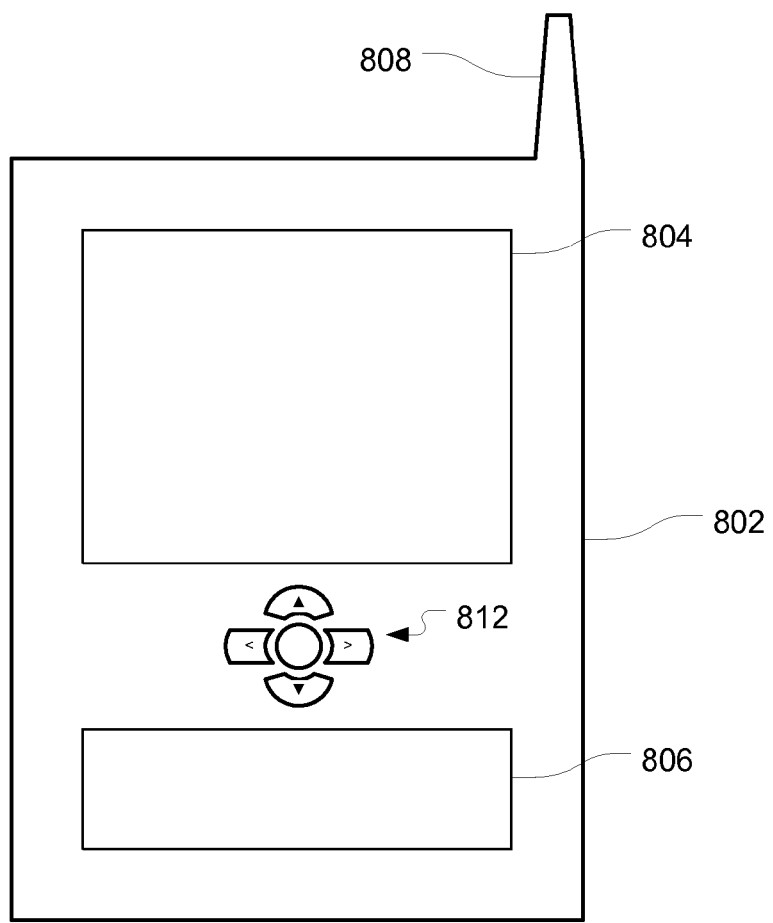
FIG. 8 illustrates one embodiment of a device.

FIG. 8 illustrates one embodiment of a device 800 in which functionality of the present invention as described herein may be implemented. In one embodiment, for example, device 800 may comprise a communication system. In various embodiments, device 800 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, and so forth. The embodiments are not limited in this context.

In one embodiment, device 800 may be implemented as part of a wired communication system, a wireless communication system, or a combination of both. In one embodiment, for example, device 800 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise a five-way navigation button 812. I/O device 806 may comprise a suitable keyboard, a microphone, and/or a speaker, for example. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    sending by a primary user to a server an indication of one or more users to be invited to use a personal channel through which the primary and invited users can forward content to the server, store the content on the server, and access the content stored on the server, wherein the content comprises at least one of an audio file, a video file, and an image file, stored by the primary or invited users on the server;
    determining by the server a unique local channel identifier (ULCI) for the personal channel, wherein the personal channel represents a channel through which the primary user and the one or more invited users can access the content stored on the server, such that the personal channel is identified by the ULCI, which is a single previously unassigned television channel identifier that is commonly available to the primary and invited users, wherein the ULCI determination comprises querying the primary and invited users to identify one or more unassigned channel identifiers;
    creating sub-channels under the personal channel, wherein each sub-channel is assigned a sub-channel ULCI by the server, and wherein each sub-channel provides access only to a subset of the content that is accessible within the personal channel; and
    allowing access to the personal channel, and to the content stored through the personal channel, by the primary user and the one or more invited users via the ULCI.

2. The method of claim 1, wherein sending by the primary user to the server the indication of the one or more users to be invited to use the personal channel is done via social networking technology.

3. The method of claim 2, wherein the social networking technology includes one of buddy list technology, web sharing technology and personal computer contact list technology.

4. The method of claim 1, wherein allowing access comprises allowing access to the personal channel by the primary user and the one or more invited users via keying the ULCI into a remote control device in a television environment.

5. The method of claim 1, wherein allowing access comprises allowing access to the personal channel by the primary user and the one or more invited users by activating the personal channel on a networked electronic channel guide in a television environment.

6. A system, comprising:
    a primary device; and
    one or more invited devices, wherein the primary device and the one or more invited devices are connected to a server via a network,
    wherein the server is configured to receive, from a primary user, an indication of one or more users to be invited to use a personal channel, the server configured to determine and send a unique local channel identifier (ULCI) for the personal channel to the primary device and the one or more invited devices, wherein the personal channel represents a channel through which the primary device and the one or more invited devices can access the content stored on the server,
    wherein the primary and invited devices are configured to forward content to the server, store content on the server, and access the stored content on the server through the personal channel, such that the personal channel is identified by the ULCI, which is a single previously unassigned television channel identifier that is commonly available to the primary and invited devices, wherein the ULCI determination comprises querying the primary and invited users to identify one or more unassigned channel identifiers,
    wherein the personal channel is to include sub-channels, wherein the server is to send a sub-channel ULCI for each of the sub-channels to the primary device and the one or more invited devices, and wherein each sub-channel provides access only to a subset of the content that is accessible within the personal channel,
    wherein the primary device and the one or more invited devices are configured to access the personal channel and the content stored through the personal channel, via the ULCI, and
    wherein said content comprises one or more of an audio file, a video file, and an image file, stored by the primary or invited users on the server.

7. The system of claim 6, wherein the primary device to use social networking technology to send the server an indication of the one or more invited devices.

8. The system of claim 7, wherein the social networking technology includes one of buddy list technology, web sharing technology and personal computer contact list technology.

9. The system of claim 6, wherein the primary device and the one or more invited devices are to access the personal channel via keying the ULCI into a remote control device in a television environment.

10. The system of claim 6, wherein the primary device and the one or more invited devices are to access the personal channel by activating the personal channel on a networked electronic channel guide in a television environment.

11. A machine-readable non-transitory storage medium containing instructions which,
when executed by a processing system, cause the processing system to perform a method, the method comprising:
sending by a primary user to a server an indication of one or more users to be invited to use a personal channel through which the primary and invited users can forward content to the server, store the content on the server, and access the stored content on the server, wherein the content comprises one or more of an audio file, a video file, and an image file, stored by the primary or invited users on the server;
determining by the server a unique local channel identifier (ULCI) for the personal channel, wherein the personal channel represents a channel through which the primary user and the one or more invited users can access the content stored on the server, such that the personal channel is identified by the ULCI, which is a single previously unassigned television channel identifier that is commonly available to the primary and invited users, wherein the ULCI determination comprises querying the primary and invited users to identify one or more unassigned channel identifiers;
creating sub-channels under the personal channel, wherein each sub-channel is assigned a ULCI by the server, and wherein each sub-channel provides access only to a subset of the content that is accessible within the personal channel; and
allowing access to the personal channel, and to the content stored through the personal channel, by the primary user and the one or more invited users via the ULCI.

12. The machine-readable storage medium of claim 11, wherein sending by the primary user to the server the indication of the one or more users to be invited to use the personal channel is done via social networking technology.

13. The machine-readable storage medium of claim 12, wherein the social networking technology includes one of buddy list technology, web sharing technology and personal computer contact list technology.

14. The machine-readable storage medium of claim 11, wherein allowing access comprises allowing access to the personal channel by the primary user and the one or more invited users via keying the ULCI into a remote control device in a television environment.

15. The machine-readable storage medium of claim 11, wherein allowing access comprises allowing access to the personal channel by the primary user and the one or more invited users by activating the personal channel on a networked electronic channel guide in a television environment.

* * * * *